July 28, 1959 — R. L. BISHOP ET AL — 2,896,455
GYROSCOPIC DEVICES
Filed Dec. 31, 1954 — 3 Sheets-Sheet 1

INVENTORS.
RONALD L. BISHOP
WENDELL D. JEWELL
DANIEL RADOV
JOSEPH STATSINGER
BY
Raymond A. Paquin
ATTORNEY.

INVENTORS.
RONALD L. BISHOP
WENDELL D. JEWELL
DANIEL RADOV
JOSEPH STATSINGER

BY
ATTORNEY.

INVENTORS.
RONALD L. BISHOP
WENDELL D. JEWELL
DANIEL RADOV
JOSEPH STATSINGER
BY
*Raymond A. Paquin*
ATTORNEY.

United States Patent Office 2,896,455
Patented July 28, 1959

2,896,455

GYROSCOPIC DEVICES

Ronald L. Bishop, Oceanside, Wendell D. Jewell, West Hempstead, Daniel Radov, New York, and Joseph Statsinger, Bayside, N.Y., assignors to American Bosch Arma Corporation, a corporation of New York Application December 31, 1954, Serial No. 479,144

24 Claims. (Cl. 74—5.5)

The subject matter of this patent may be used by or for the Government for governmental purposes without the payment of any royalties to us.

The present invention relates to gyroscopic devices and has particular reference to compasses for vehicular use.

Gyroscopic compasses intended for installation on land vehicles must be extremely small in size without sacrificing a great deal of accuracy. One effort in this direction was made in the miniature compass described in U.S. Patent No. 2,677,194, issued May 4, 1954, for "Gyroscopic Compass." The present invention is an improvement of that compass resulting in further miniaturization and improved operation.

One feature of the present compass is in the gimballing structure whereby the spin axis of the gyroscope is made substantially coincident with the tilt axis of the compass so that the intercardinal swinging errors are reduced.

Another feature of the invention is found in the construction of the sensitive element. The rotating mass of the gyroscope is split into two sections, permitting a throat or channel to be formed in the gyro casing such that a gimbal ring can be located therein. The advantages resulting from this construction are many. The absence of the protruding gimbal ring allows the tank to be made to fit closely around the gyro casing. This will reduce the required amount of suspending fluid to a minimum and therefore reduce the warmup period. Also, the sunken gimbal ring will not be as greatly affected by convection currents in the fluid since its area and diameter are smaller.

A third feature is the use of the self-synchronous position transmitter as part of the computing circuit, resulting in a smaller and more economical instrument.

The effects of these and other features will be described later. For a better understanding of the invention, reference may be had to the accompanying drawings in which, Fig. 1 shows the general outline of the compass;

Referring now to the figures, numeral 10 designates the compass tank 10 which houses the sensitive gyro ball 11. The gyro ball 11 is suspended in neutral flotation in a high density liquid 12 contained in tank 10 and completely filling the space between the ball 11 and tank 10, and as will be seen from the Bishop patent referred to above, the tank 10 corresponds to the outer gimbal ring in conventionally supported gyroscopes.

Figure 3:
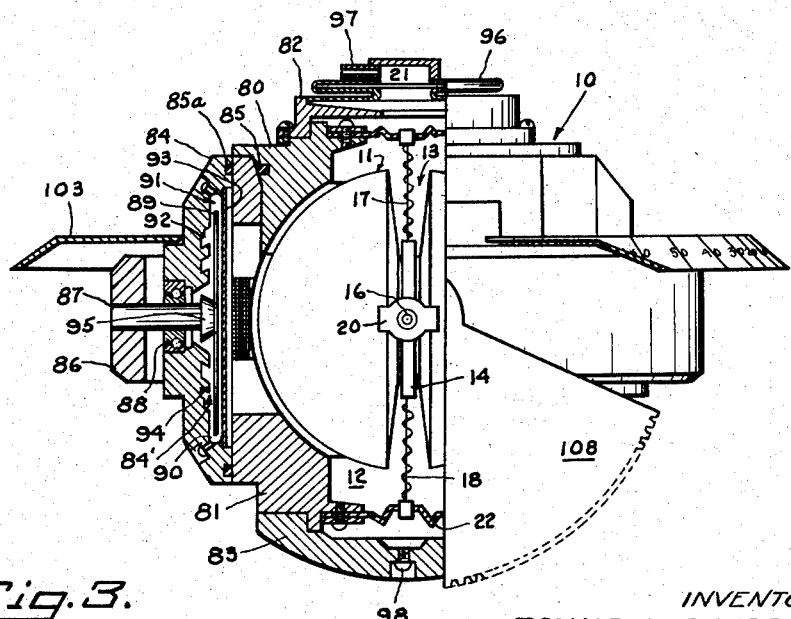
Fig. 3 is a partial section of the gyro casing with the cutting plane passing through 3.3 of Fig. 2.

Gimbal ring 14, located in a deep channel 13 at the equator of the ball 11, is connected to the ball 11 by the horizontal torsion filaments 15 and 16 and to the tank 10 by the vertical torsion filaments 17 and 18. The outer ends of torsion filaments 15 and 16 are fastened to flat springs 19 and 20 which bridge the channel 13, as seen in Fig. 3. The outer ends of the vertical torsion filaments 17 and 18 are fastened to diaphragms 21 and 22 respectively which are supported from tank 10 by spiders, for example, so that fluid 12 is free to flow around the diaphragms. The preferred construction of the sensitive element or gyro ball 11 is shown particularly in the cross sectional view, Fig. 4. The channel 13 is formed as a ring 23 which constitutes the central portion of the ball 11. The stator laminations 24 of the motive means for the rotating gyro wheels are held in the ring 23 and are retained therein by the shoulder 25 and the retaining ring 26 which is screwed into the ring 23 against the laminations 24.

Preloading of gyro bearings is a well known procedure. However, prior methods of preloading have sometimes introduced erratic weight shifts, contributed to relatively short bearing life or raised certain production problems. In our method one bearing is fixedly supported in the gyro housing, the other bearing is suspended from the housing in a member having stiffness axially of the gyroscope shaft and high radial stiffness. For example, the suspending member may be an extremely thin annular plate secured to the housing at its outer edge and carrying the bearing in its central opening. Alternatively, the annular plate may be cut out at certain places so that the bearing is effectively supported in a spider-like member. It will be seen that this method of preloading of the gyro bearing does not introduce any sliding friction between the bearing and the housing. At the same time the bearings are not overloaded and the preloading force will not vary appreciably with time.

In addition, this arrangement permits positive preloading of the bearings in a simple manner and avoids the possibility of bearing damage due to excessive preloading as may occur when the loading is accomplished by deforming the bearings.

In the present construction one end of ring 23 is formed to receive and hold the bearing assembly 27. A substantially similar bearing assembly 28 is suspended in spider 29 which is fastened to the opposite end of ring 23. Spider 29 is preferably stressed to apply a preload to the bearings 27 and 28. This construction is effective in reducing the errors which accompany dimensional changes resulting from whatever cause, such as wear and temperature changes. Stress may be applied to the spider by properly dimensioning the ring 23 with respect to the distance between the bearings 27 and 28 for example. Shaft 30 is journalled in bearings 27 and 28 and carries at its center the laminations 31 for the rotor of the motive means for rotating the gyro wheels 32 and 33. These wheels 32 and 33 are securely fastened to the ends of shaft 30 by means of nuts 34, 34 for example.

End bells 35 and 36 are attached to the ring 23 by soldering, for instance, to complete the shell of the substantially spherical and hermetically sealed gyro ball 11. The magnet assemblies 37 and 38 for pickoff units 43, 44 are attached to the inner surface of the respective end bells 35 and 36 in line with the shaft 30. The electrical connections for the magnets pierced the end bells 35 and 36 at terminals 39, 40, 41 and 42 which are insulated from ball 11 and are hermetically sealed.

Figure 4:
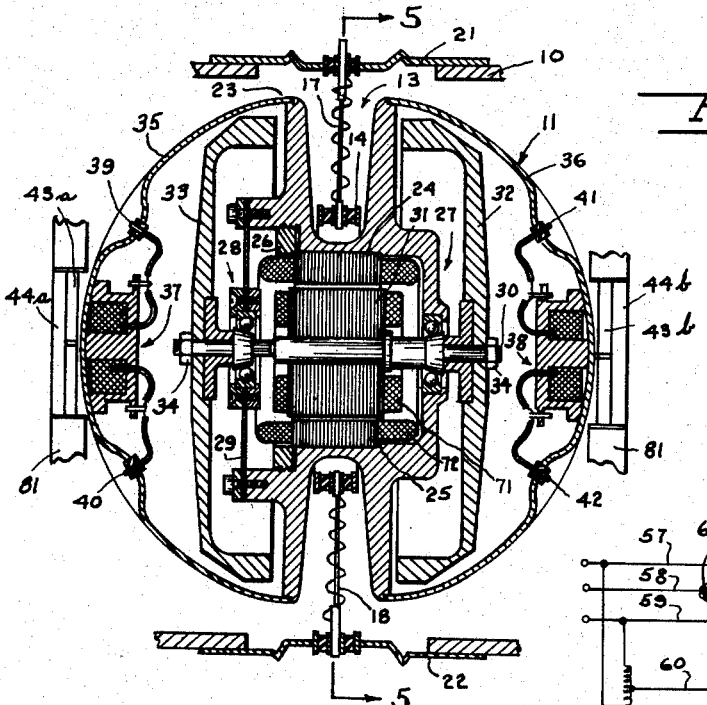
Fig. 4 is one sectional view of the sensitive element or gyro ball.

As shown in Figures 3 and 4, the surfaces of the channel 13 are slightly inclined to form a V-shaped channel. This shape has been found to be far superior to a channel having parallel sides. One reason for this is that the slanting sides give the required clearance between tank 10 and the filaments 17 and 18. Air bubbles which may form and would otherwise cling to the sides of the channel in vertical spin axis gyroscopes are allowed to escape with this construction.

Figure 5:
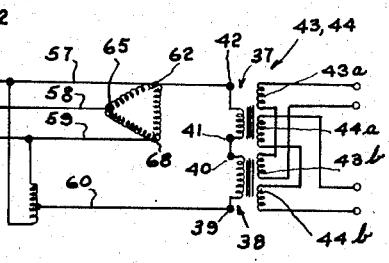
Fig. 5 is another section of the gyro ball showing particularly the inner gimbal and torsion filament construction.
Figure 5:
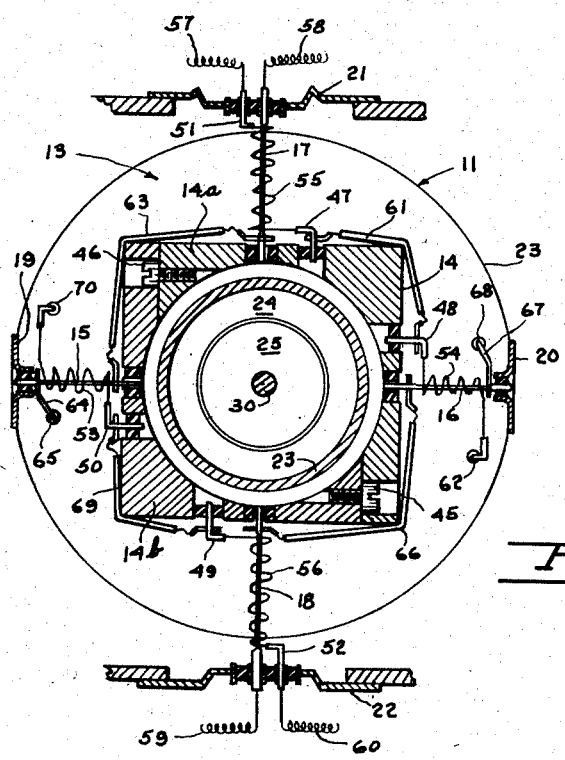

As shown in Fig. 5, the gimbal ring 14 is made up of two pieces 14a and 14b which are joined by the screws 45 and 46. The gimbal ring 14 carries four electrical terminals 47, 48, 49 and 50 which are electrically insulated from the gimbal ring 14. The ends of the torsion filaments 15, 16, 17 and 18 which are securely fastened to the gimbal ring 14 are also electrically insulated therefrom. Similarly, the ends of the torsion filaments 15, 16 and 17, 18 are mechanically fastened to the springs 19, 20 and diaphragms 21, 22 respectively but are electrically insulated therefrom. Additional electrical terminals 51 and 52 are held in and electrically insulated from the diaphragms 21 and 22 respectively.

Electrical connections between the outside of ball 11 and the tank 10 are made through the torsion filaments 15, 16, 17, 18 and the extremely flexible helical wires or flexes 53, 54, 55, 56 which surround each of the torsion filaments. Thus wire 57 is electrically connected to terminal 51, through flex 55 to terminal 47, through wire 61 to terminal 48, and through flex 54 to the leadin terminal 62 on ring 23. Wire 58 is connected through torsion filament 17, wire 63, torsion filament 15 and connector 64 to the leadin terminal 65 on ring 23. Wire 59 is connected through torsion filament 18, wire 66, torsion filament 16, connector 67 to the leading terminal 68 on ring 23. Wire 60 is connected through terminal 52, flex 56, terminal 49, thence by wire 69 to terminal 50, and through flex 53 to the terminal 70 on, but insulated from, the ring 23. The wires 61, 63, 66 and 69 are, of course, electrically insulated from the gimbal ring 14.

Figure 6:
Fig. 6 is a schematic diagram of the inner wiring of the gyro compass.

Fig. 6 is a schematic diagram of the electrical connections of the motor windings 72, and the pickoff devices 43, 44. The secondary windings 43a, 43b, 44a and 44b of the pickoff devices may be of the familiar "umbrella" type described in the aforementioned U.S. patent, but are merely shown schematically in Fig. 6 for simplicity. Thus the motor windings 72 are energized from a three phase supply, which is connected to the wires 57, 58 and 59, while the pickoff magnets are energized by one phase of the three phase supply through an autotransformer connected between wires 57 and 59 having an intermediate tap connected to wire 60.

Figure 1:
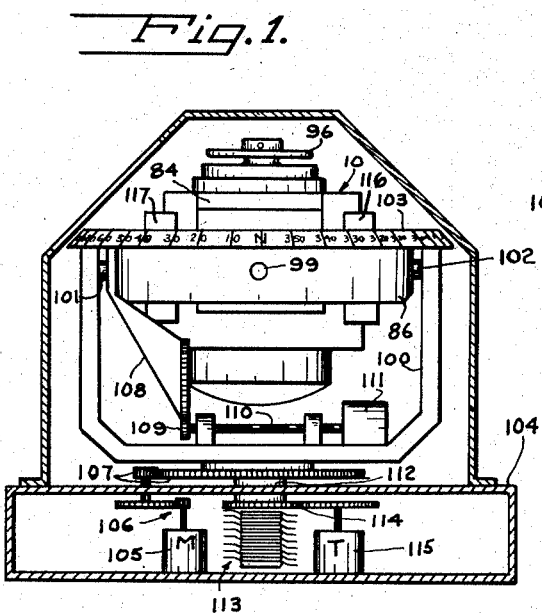
Figure 2:
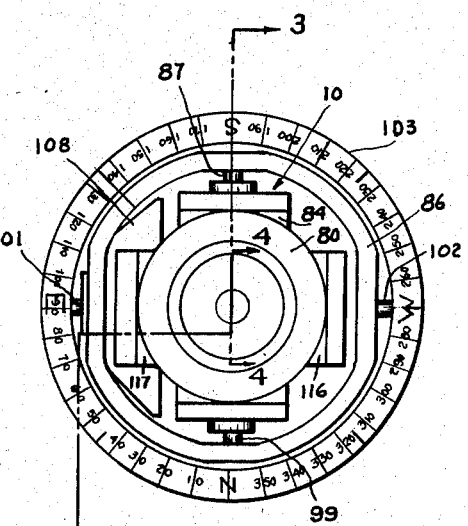
Fig. 2 is a top view of the compass, without the casing.

Fig. 3 is a partial cross section of the tank 10 taken along the line 3.3 of Fig. 2. The tank 10 includes upper and lower main sections 80 and 81 (to which the diaphragms 21 and 22 respectively are fastened) upper and lower end caps 82 and 83, and two covers, of which only one 84 is shown. The main sections 80 and 81 may be partially cylindrical so that the upper section 80 telescopes into lower section 81. The juncture between the sections is made fluid tight by the sealing ring 85. End caps 82 and 83 are formed so as to provide fluid tight joints when connected to the main sections. Cover 84 is attached to a flattened portion of the lower section 81 and carries a sealing ring 85a to make the juncture fluid tight. Cover 84 also contains a viscous damp 84' provided between tank 10 and horizontal gimbal ring 86. Shaft 87 of the gimbal ring 86 is trunnioned in the bearing 88 carried in cover 84. Attached to the inner end of shaft 87 is a disc 89, the edge of which dips into a viscous fluid 90. The reservoir 91 for fluid 90 is formed in a recess in cover 84 between the inner ridged face 92 and a fluid tight plate 93. The face 92 of the reservoir 91 is ridged with concentric rings 94 in which the sides of the rings are at an angle to shaft 87, as shown. The end of shaft 87 is also formed with a conical bulb 95. The rings 94 and bulb 95 combine to prevent leakage of fluid 90 through bearing 88. Any fluid 90 which may find itself at the top of the reservoir 91 will settle to the bottom of the reservoir 91 through the recesses between the ring 94 and very little will be able to escape towards the bearing 88.

Inserted into the upper cap 82 is a bellows 96 which allows expansion and contraction of the fluid 12 with temperature changes and a filler pipe 97 for the fluid 12. A drain plug 98 is provided in the lower cap 83.

Tank 10 is suspended in the gimbal ring 86 by shafts 87, 99 and the gimbal ring 86 is suspended in the azimuth gimbal frame 100 by shafts 101, 102. Azimuth frame 100 carries the compass card 103 on which the E—W markings are in line with the shafts 101, 102. Frame 100 is rotatably mounted on the base 104 in appropriate bearings and may be driven in azimuth by motor 105 through gearing 106, 107. Gimbal ring 86 carries the sector gear 108 which meshes with the pinion 109 attached to the shaft 110 of motor 111. Motor 111 is, of course, carried on the azimuth frame 100, and rotation of shaft 110 causes the gimbal ring 86 to tilt about the axis through shafts 101, 102.

Attached to the pivot shaft 112 of the azimuth frame 100 are the slip rings 113 for feeding electrical power to and from the gyro proper. Also shaft 112 carries one of the gears 114, 114 by means of which the rotor of synchro transmitter 115 is displaced. The output of the transmitter 115 is, therefore, an indication of the direction of the shaft 99 with respect to the base 104 which is the course of the vehicle when the gyro axis is on the meridian.

Figure 7:
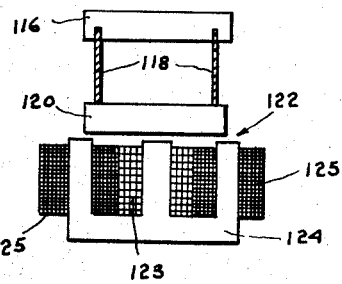
Fig. 7 is a sectional view of a preferred pendulum and pickoff device.

The gyro casing 10 also carries a pendulum in the support 116. A weight 117 which may be a terminal block, for example, is attached to the casing 10 to counterbalance the weight of the pendulum assembly 116. A typical and preferred form of pendulum is shown in section in Fig. 7. An armature 120 is suspended from support 116 by the flat leaf springs 118, 118. The armature 120 forms part of a standard E—I pickoff device 122 in which a primary winding 123 is wound on the center leg of an E-shaped magnetic core 124 and a pair of pickoff secondaries windings 125, 125 are wound on the outer legs of the core 124.

Figure 8:
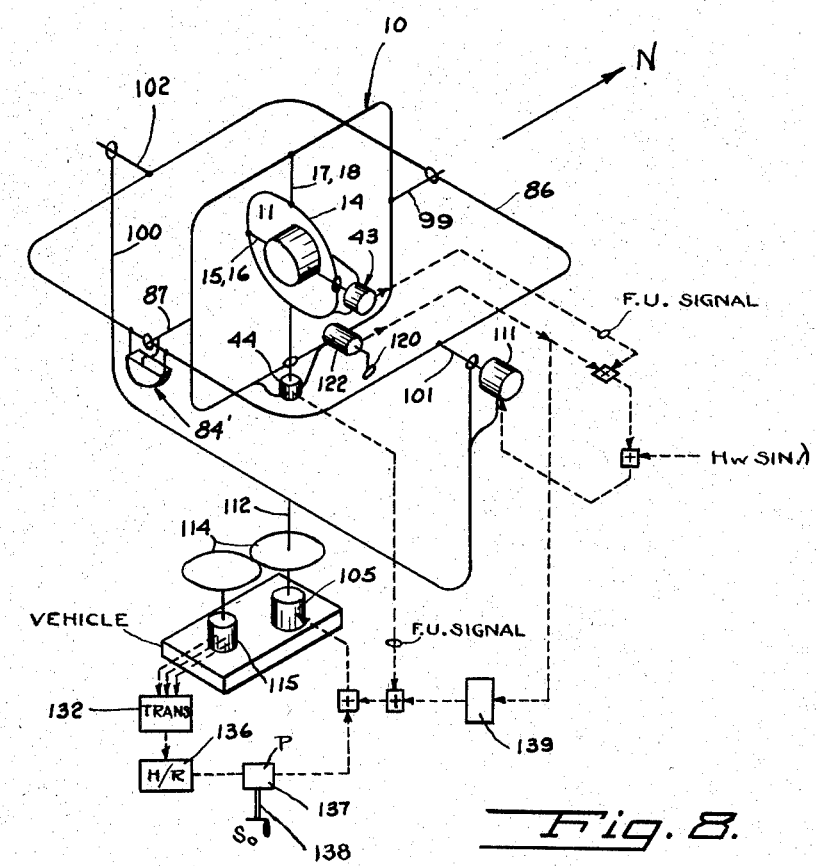
Fig. 8 is a schematic representation of the gyro compass.

Refer now to Fig. 8 which is a schematic representation of the compass and in which electrical connection between elements are shown by dotted lines. It must be realized that the necessary appurtenances such as amplifiers, scaling devices etc., are not shown but anyone skilled in the art will recognize their need.

The operation of the gyro compass will become clear by reference to the aforementioned U.S. patent. However, for completeness, the operation will be briefly described here by recitation of a sequence of events which results in bringing the compass to the meridian although it will be understood that all of these operations are occurring at the same time.

Assuming that the spin axis of the gyro 11 is displaced from the meridian, the easterly end of the axis will apparently rise as the earth rotates, causing frame 14 to be displaced with respect to gyro 11. The resulting output of pickoff 43, applied to motor 111 tends to cause motor 111 to drive the gimbal ring 86, tank 10 and gimbal 14 until the gimbal ring 14 coincides with the gyro 11. Hence, the pendulum 120, indicating the vertical will produce an output voltage from pickoff 122 which is also applied to motor 111.

In response to this pendulum signal, motor 111 drives the gimbal frame 14 away from the gyro 11 thereby twisting the torsion filaments 16, 16 which therefore apply a torque to the gyro such as to cause the gyro 11 to precess toward a meridian. Depending on the relative output polarities of the pickoffs 43 and 122, the gyrocompass can be made either pendulous or antipendulous and the direction of rotation of the gyro must be chosen accordingly. For example, in an antipendulous compass the outputs of the pickoffs 122 and 43 will be made to be in the same direction, while for a compass which is pendulous, the output of pickoff 122 is made to oppose the output of pickoff 43, when the displacement of the tank 10 from the vertical is in the same direction as the displacement of the gyro spin-axis from the gimbal frame 14. In selecting the output gradients of the pickoffs 43 and 122, the torsional strength of the torsion filaments 15, 16 must be considered, so that the magnitude of the torque applied to the gyro will be properly proportional to the output of the pickoff devices.

As the gyro 11 precesses toward the meridian the follow-up action between pickoff 44 and motor 105 tends to keep the shafts 87, 99 aligned with the gyro spin axis. However, a portion of the output of the pendulum pickoff 122 selected by the voltage divider 139, is also applied to motor 105 so that a slight displacement between tank 10 and gyro 11 is developed whereby the torsion filaments 17, 18 are twisted to cause the gyro spin axis to precess toward the horizontal. This action supplies vertical damping for the gyro.

In order to have the compass settle on the meridian in a horizontal position, the "north steaming" correction $$\frac{H}{R}S_o \cos C_o$$

is applied about the vertical axis by torsion filaments 17, 18, and the latitude correction $Hw \sin \lambda$ is applied about the horizontal axis by torsion filaments 15, 16 by providing signals proportional to these corrections to the motors 105 and 111 respectively, jointly with the other signal already explained. The symbols used above are the same as normally used in gyroscopics where, $H$=angular momentum of gyro wheel
$R$=radius of the earth
$S_o$=speed of the vehicle
$C_o$=course of the vehicle
$W$=angular velocity of the earth
$\lambda$=angle of latitude of the vehicle position The reasons for the corrections and their application will be readily understood by those in the art.

Figure 9:
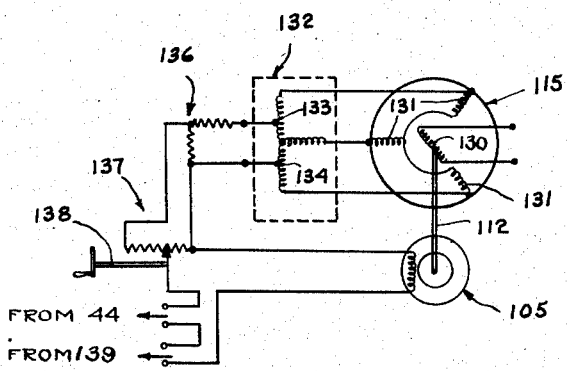
Fig. 9 is a schematic wiring diagram of a portion of the electrical circuit of the compass.

The $HS_o \cos C_o$ signal may be derived as indicated in Fig. 8, and shown more clearly in Fig. 9. The rotor winding of 130 of the synchro transmitter 115, energized by a constant alternating voltage, is operatively connected to the shaft 112. The stator windings 131 of the transmitter 115 are connected to the three-phase terminals of a Scott connected auto-transformer 132. The output of transformer 132 is proportional to the cosine of the displacement of the rotor winding 130 from its zero position, or is proportional to course of the vehicle. The $C_o$ signal is multiplied by $$\frac{H}{R}$$

in the voltage divider 136, and by $S_o$ in the variable voltage divider 137, the controlling shaft 138 of which is displaced according to $S_o$, either manually or automatically, as desired. The output of voltage divider 137 is, therefore, proportional to $$\frac{H}{R}S_o \cos C_o$$

which is the "north steaming" correction previously referred to.

In connection with the gimbal structure, as seen most clearly in Fig. 8, the departure over previous methods of compass gimballing is that the tilt axis of the tank is substantially coincident with the gyro spin axis. The results of suspending the pendulous tank 10 in a gimbal ring 86 which is pivoted about an E—W axis rather than using the prior method of suspending the tank in a pendulous gimbal ring which is pivoted about a N—S axis reduces the errors due to swinging of the compass as the vehicle rolls and pitches. Except for the fact that the correcting torques are applied through the torsion filaments by offsetting the gimbal system from the gyro, the spin axis and the tilt axis would be exactly coincident.

In cases where the correcting torques are applied by the more conventional means, such as torque motors, and the spin axis is exactly coincident with the tilt axis, the swinging errors are completely eliminated.

We claim:

1. In a device of the character described, a gyroscope ball, said ball having an equatorial channel, said channel having its opposed sides diverging from the center outward.

2. In a device of the character described, a gyroscope ball, said ball having an equatorial channel, said channel having its opposed sides tapering from the center outward.

3. In a device of the character described, a gyroscope ball, said ball having an equatorial channel, said channel having its opposed sides V-shaped from the center outward.

4. In a device of the character described, a gyroscope ball, said ball having an equatorial channel, said channel having its opposed sides V-shaped diverging outwardly from the center outward.

5. In a device of the character described, a gyroscope ball, said ball having an equatorial channel, said channel having its opposed sides diverging from the center outward and a gimbal ring in said channel for positioning said gyroscope ball.

6. In a device of the character described, a gyroscope ball, said ball having an equatorial channel, said channel having its opposed sides tapering from the center outward and a gimbal ring in said channel for positioning said gyroscope ball.

7. In a device of the character described, a gyroscope ball, said ball having an equatorial channel, said channel having its opposed sides V-shaped from the center outward and a gimbal ring in said channel for positioning said gyroscope ball.

8. In a device of the character described, a gyroscope ball, said ball having an equatorial channel, said channel having its opposed sides V-shaped diverging outwardly from the center outward and a gimbal ring in said channel for positioning said gyroscope ball.

9. In a device of the character described, a tank, a gyroscope ball suspended in said tank, said ball having an equatorial channel, said channel having its opposed sides diverging from the center outward and a gimbal ring in said channel for positioning said gyroscope ball and first torsion members connected between said gimbal ring and said ball, and second torsion members connected between said gimbal ring and tank.

10. In a device of the character described, a tank, a gyroscope ball suspended in said tank, said ball having an equatorial channel, said channel having its opposed sides V-shaped from the center outward and first torsion members connected between said gimbal ring and said ball, and second torsion members connected between said gimbal ring and tank.

11. In a device of the character described, a gyroscope ball, said ball having an equatorial channel, said ball also having a throat surrounded by said channel.

12. In a device of the character described, a gyroscope ball, said ball having an equatorial channel, said ball also having a throat surrounded by said channel and a stator in said throat, a rotor within said stator.

13. In a device of the character described, a gyroscope ball, said ball having an equatorial channel, said ball also having a throat surrounded by said channel and a stator in said throat, a rotor within said stator, a shaft for said rotor, said shaft being journalled in bearings and carrying gyroscopic wheels adjacent its opposite ends.

14. In a device of the character described, a gyroscope ball, said ball having an equatorial channel, said ball also having a throat surrounded by said channel and a stator in said throat, a rotor within said stator, a shaft for said rotor, said shaft being journalled in bearings and carrying gyroscopic wheels adjacent its opposite ends, said wheels having a diameter greater than the diameter of said throat.

15. In a device of the character described, a gyroscope adapted to maintain its spin axis on the meridian, a gimbal, said gyroscope being supported within said gimbal, a gimbal ring, said gimbal being supported in said gimbal ring by shafts substantially coaxial with the gyro spin axis, and viscous damping means between said gimbal and gimbal ring.

16. In a device of the character described, a gimbal, a gyroscope supported within said gimbal for rotation about substantially vertical and horizontal axes, said gimbal being supported in a gimbal ring by shafts substantially coaxial with the gyro spin axis, and viscous damping means between said gimbal and gimbal ring.

17. In a device of the character described, a synchro transmitter, having stator windings, a transformer having windings, each of said transformer windings being connected to said stator windings and to a common point, and taps on said transformer windings.

18. In a device of the character described, a synchro transmitter, having stator windings, a transformer having windings, each of said transformer windings being connected to said stator windings and to a common point, and taps on said transformer windings, motive means operatively connected to said transmitter and partially energized by the output of said transformer.

19. In a device of the character described, a synchro transmitter having stator windings, a Scott connected auto transformer having windings, each of said transformer windings being connected to said stator windings.

20. In a device of the character described, a synchro transmitter having stator windings, a Scott connected auto transformer having windings, each of said transformer windings being connected to said stator windings, motive means operatively connected to said transmitter and partially energized by the output of said transformer.

21. In a device of the character described, a pair of relatively movable members, one of said members being supported in the other by shaft means, a fluid reservoir in one of said members, said reservoir having concentric rings about said shaft means, said fluid reservoir being only partially filled with fluid, a disc connected at its center to said shaft means and extending into said fluid, a bulb on the end of said shaft means to prevent escape of fluid, said concentric rings sloping outwardly away from said shaft means.

22. In a device of the character described, a pair of relatively movable members, one of said members being supported in the other by shaft means, a fluid reservoir in one of said members, said fluid reservoir having concentric rings about said shaft means, said fluid reservoir being only partially filled with fluid and a bulb on the end of said shaft means to prevent the escape of fluid, said concentric rings sloping outwardly away from said shaft means.

23. In a device of the character described, a pair of relatively movable members, one of said members being supported in the other by shaft means, a fluid reservoir in one of said members, said reservoir having concentric rings about said shaft means, said fluid reservoir being only partially filled with fluid, a disc connected at its center to said shaft means and extending into said fluid, a means on the end of said shaft means to prevent escape of fluid, said concentric rings sloping outwardly away from said shaft means.

24. In a device of the character described, a gyroscope ball, said ball having an equatorial channel, said channel having its opposed sides diverging from the center outward, and a gimbal ring in said channel for positioning the gyroscope ball, a second gimbal ring, first torsion members connected between said first gimbal ring and said ball, and second torsion members connected between said first gimbal ring and said second gimbal ring.

References Cited in the file of this patent

UNITED STATES PATENTS

| | | |
|---|---|---|
| 1,086,242 | Sweeny | Feb. 3, 1914 |
| 1,308,693 | Beattie | July 1, 1919 |
| 1,315,058 | Vincent | Sept. 2, 1919 |
| 1,589,039 | Anschutz-Kaempfe | June 15, 1927 |
| 1,743,533 | Davis | Jan. 14, 1930 |
| 1,969,755 | Kellogg | Aug. 14, 1934 |
| 2,163,528 | Lauck | June 20, 1939 |
| 2,410,002 | Bach | Oct. 29, 1946 |
| 2,433,837 | Dawson | Jan. 6, 1948 |
| 2,445,388 | Carlson | July 20, 1948 |
| 2,451,230 | Lundberg | Oct. 12, 1948 |
| 2,620,570 | Minas | Dec. 9, 1952 |
| 2,677,194 | Bishop | May 4, 1954 |
| 2,700,829 | Statsinger | Feb. 1, 1955 |